United States Patent
Mulla et al.

(10) Patent No.: US 9,210,145 B2
(45) Date of Patent: Dec. 8, 2015

(54) METHOD AND SYSTEM FOR HYPERTEXT TRANSFER PROTOCOL DIGEST AUTHENTICATION

(71) Applicant: Research In Motion Limited, Waterloo (CA)

(72) Inventors: Imtiyaz Ahmed Mulla, Toronto (CA); Dejan Petronijevic, Toronto (CA); Jane Ellen Hearnden, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/739,710

(22) Filed: Jan. 11, 2013

(65) Prior Publication Data

US 2014/0095873 A1    Apr. 3, 2014

Related U.S. Application Data (60) Provisional application No. 61/708,874, filed on Oct. 2, 2012.

(51) Int. Cl.
*H04L 29/06*    (2006.01)
*H04L 9/32*    (2006.01)
*H04L 29/08*    (2006.01)

(52) U.S. Cl.
CPC ........ *H04L 63/08* (2013.01); *H04L 9/32* (2013.01); *H04L 63/0807* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 8,042,163 B1* | 10/2011 | Karr et al. | 726/9 |
| 8,417,828 B2* | 4/2013 | Ma et al. | 709/231 |
| 2009/0235349 A1* | 9/2009 | Lai et al. | 726/14 |
| 2010/0293385 A1 | 11/2010 | Nanda et al. | |
| 2012/0084565 A1* | 4/2012 | Wittenberg et al. | 713/172 |
| 2013/0086679 A1* | 4/2013 | Beiter | 726/22 |

FOREIGN PATENT DOCUMENTS

WO    0239237    5/2002

OTHER PUBLICATIONS

Stallings, "Cryptography and Network Security Principles and Practices" Prentice Hall, 2003, 3rd Edition, pp. 538-543.*
Menezes et al., "Handbook of Applied Cryptograph." CRC Press, 1997, pp. 509-512.*
Koh et al., "The Evolution of the Kerberos Authentication Service", IEEE Computer Society Press, 1994.*
Franks, et al, Request for Comments (RFC) 2069, "An Extension to HTTP : Digest Access Authentication", Jan. 1997.
Franks, J. et al, Request for Comments (RFC) 2617, "HTTP Authentication: Basic and Digest Access Authentication", Jun. 1999.
European Search Report on European Application No. 13151078.6, issued Jul. 19, 2013.
Canadian Patent Office Action for Canadian Patent Application No. 2,829,233, mailed Apr. 8, 2015.

* cited by examiner

*Primary Examiner* — Minh Dinh
*Assistant Examiner* — Wayne An
(74) *Attorney, Agent, or Firm* — Moffat & Co.

(57) ABSTRACT

A method and system for hypertext transfer protocol digest authentication through the use of a token issuing entity trusted by both a client and a service provider. The token issuing entity may issue an encrypted token and a token secret to the client. The client may then use the token secret instead of a password for digest authentication, and provided the encrypted token along with the digest authentication response to the service provider. The service provider may decrypt the encrypted token to obtain the token secret, which may then be used for digest authentication with the client.

42 Claims, 4 Drawing Sheets

METHOD AND SYSTEM FOR HYPERTEXT TRANSFER PROTOCOL DIGEST AUTHENTICATION

FIELD OF THE DISCLOSURE

The present disclosure relates to authentication between a client and a server and in particular relates to hypertext transfer protocol (HTTP) digest authentication between a client and a server.

BACKGROUND

One option to authenticate a client with a server is referred to as digest access authentication, which is a challenge-response system in which a shared secret between the client and the server are utilized to authenticate the client with the server. Digest access authentication improves upon earlier versions of HTTP authentication, in which users provided passwords that were either not encrypted when sent to a server, leaving them vulnerable to capture by attackers, or encrypted but sent in an expensive, ongoing, secure sockets layer (SSL) session.

The Internet Engineering Task Force (IETF) has created protocols for digest access authentication, as for example found in the Request For Comments (RFC) 2069, *"An Extension to HTTP: Digest Access Authentication"*, January 1997, and subsequently in RFC 2617, *"HTTP Authentication: Basic and Digest Access Authentication"*, the contents of both of which are incorporated herein by reference.

In both RFC 2069 and RFC 2617, a shared secret such as a client's password is hashed with other information and provided in response to a challenge. The server can then utilize the same shared secret, which it has stored previously, to create a value that is compared to the response provided by the client in order to ensure that the client is authentic. In particular, if the value created at the server matches the response sent by the client, the client is authenticated.

The need to store shared secrets and associated information, such as user names and passwords, for various service providers may be cumbersome and also provide a security risk through the requirement to store such information.

BRIEF DESCRIPTION OF THE DRAWINGS

The present disclosure will be better understood with reference to the drawings, in which.

DETAILED DESCRIPTION OF THE DRAWINGS

The present disclosure provides a method at a computing device comprising: receiving an encrypted token containing a token secret, along with the token secret in a format readable at the computing device, from a token issuing entity; receiving a challenge from a service provider; creating a response utilizing information from challenge and the token secret; and forwarding the response and encrypted token to the service provider.

The present disclosure further provides a computing device comprising: a processor, and a communications subsystem, wherein the computing device is configured to: receive an encrypted token containing a token secret along with token secret in a format readable by the computing device, from a token issuing entity; receive a challenge from a service provider; create a response utilizing information from challenge and the token secret; and forward the response and encrypted token to the service provider.

The present disclosure further provides a method at a service provider comprising: receiving a service request from an unauthorized client; providing a challenge to the client; receiving, from the client, a response with an encrypted token; decrypting the token to obtain a token secret; creating a server response utilizing information from the challenge and the token secret; and authenticating the client if the server response matches the received response.

The present disclosure still further provides a server comprising: a processor; and a communications subsystem, wherein the server is configured to: receive a service request from an unauthorized client; provide a challenge to the client; receive, from the client, a response with an encrypted token; decrypt the token to obtain a token secret; create a server response utilizing information from the challenge and token secret; and authenticate the client if the server response matches the received response.

As described in the IETF RFC 2017, digest access authentication schemes are based on a simple challenge-response paradigm. Information that is both received from the server and information stored on the client device are used to create a response to a challenge from the server, and the response value can be compared to a value generated using the same algorithm at the server in order to authenticate the client.

Figure 1:
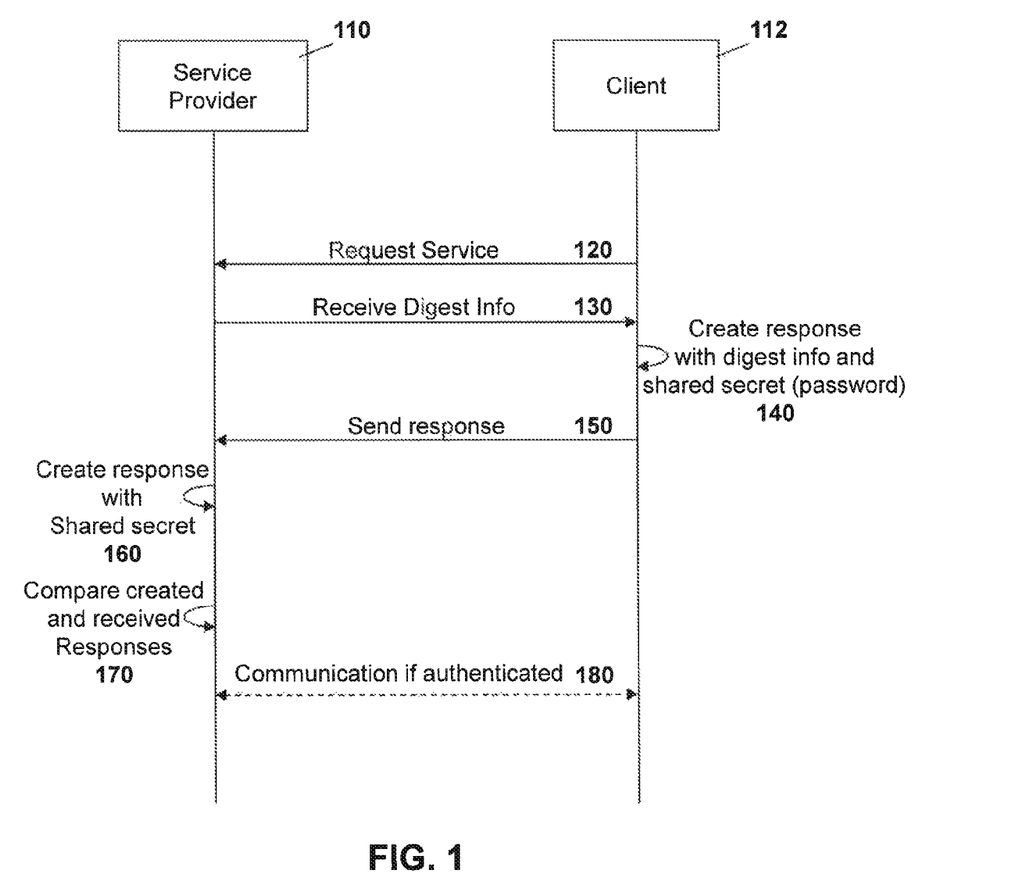
FIG. 1 is an example flow diagram showing authentication between a client and a server.

Specifically, reference is now made to FIG. 1. In FIG. 1, a service provider 110 and a client 112 communicate with each other. Such communication may be wired, wireless, or both, and will typically involve information being sent over a public network such as the Internet.

Client 112 desires to access information through service provider 110 and therefore sends a service request message 120.

In response, service provider 110 notes that the client 112 is not authenticated and, in accordance with RFC 2069 or RFC 2617, sends a "401 unauthorized" message along with digest information back to client 112, as shown by arrow 130. Such digest information may include, for example, realm information, which can be a path or space for the authentication protection and allows the client to know which user name and password to utilize, a nonce value created by the server, a domain that may specify the protection space, and "opaque" providing a value to be returned by the client, potentially a hash algorithm, a "quality of protection" value in RFC2617, among others.

The client 112 may then create a response using the digest information received at arrow 130 along with a shared secret such as a password stored at client 112, as seen by arrow 140.

If the server and client are using the RFC 2069, the response may be calculated in accordance with equation 1 below:

$$\text{response} = H(H(A1)\text{:nonce}\text{:}H(A2)) \qquad (1)$$

In the above equation 1, H( ) is a hash algorithm. By default, RFC 2069 and RFC 2617 both utilize the message-digest algorithm MD5, which is a crytographic hash function that produces a 128-bit hash value. However, the present disclosure is not meant to be limited to any particular hash function or algorithm.

A nonce, as used in equation 1 above, is a number that is only used once, or in a single set of transactions, and may typically be a random or pseudo-random number. The client creates the response of equation 1 with a nonce to avoid replay attacks, since a nonce is only used once. As defined in RFC 2069, the nonce is "a server-specified data string which may be uniquely generated each time a 401 response is made. . . . The contents of the nonce are implementation dependent. The quality of the implementation depends on a good choice. A recommended nonce would include H(client-IP ":" time-stamp ":" private-key), where client-IP is the dotted quad IP address of the client making the request, time-stamp is a server-generated time value, private key is data known only to the server. With a nonce of this form a server would normally recalculate the nonce after receiving the client authentication header and reject the request if it did not match the nonce from that header. In this way the server can limit the reuse of a nonce to the IP address to which it was issued and limit the time of the nonce's validity . . . . An implementation might choose not to accept a previously used nonce or a previously used digest to protect against a replay attack. Or, an implementation might choose to use one-time nonces or digests for POST or PUT requests and a time-stamp for GET requests . . . . The nonce is opaque to the client."

In equation 1 above, H(A1) may be provided as follows:

$$H(A1)=H(\text{username:realm:password}) \quad (2)$$

And H(A2) may be provided as follows:

$$H(A2)=H(\text{method:digest URI}) \quad (3)$$

As seen from RFC 2069, the response provided by the client as created at arrow 140 is a hash that includes various information received from the server 110 in the message at arrow 130, along with the username and password.

If the algorithm of RFC 2617 is utilized, the following is used for a response:

$$\text{response}=H(H(A1)\text{:nonce:nonceCount:clientNonce:} \\ \text{qop:}H(A2)) \quad (4)$$

The above equation 4 is only used if the digest information at message 130 includes a quality of protection (qop) value of "AUTH" or "AUTH-INT". "AUTH-INT" indicates authentication with integrity protection.

The nonce in equation 4 above is again a number only used once or a number used during each set of transactions, and may be a random or pseudo-random number in some embodiments. According to RFC 2617, the nonce is a "server-specified data string which should be uniquely generated each time a 401 response is made. It is recommended that this string be base64 or hexadecimal data. Specifically, since the string is passed in the header lines as a quoted string, the double-quote character is not allowed. The contents of the nonce are implementation dependent. The quality of the implementation depends on a good choice. A nonce might, for example, be constructed as the base 64 encoding of time-stamp H(time-stamp ":" ETag ":" private-key) where time-stamp is a server-generated time or other non-repeating value, ETag is the value of the HTTP ETag header associated with the requested entity, and private-key is data known only to the server. With a nonce of this form a server would recalculate the hash portion after receiving the client authentication header and reject the request if it did not match the nonce from that header or if the time-stamp value is not recent enough. In this way the server can limit the time of the nonce's validity. The inclusion of the ETag prevents a replay request for an updated version of the resource."

The nonceCount (nc), as defined by RFC 2617, is a value that "MUST be specified if a qop directive is sent . . . and MUST NOT be specified if the server did not send a qop directive in the WWW-Authenticate header field. The nc-value is the hexadecimal count of the number of requests (including the current request) that the client has sent with the nonce value in this request. For example, in the first request sent in response to a given nonce value, the client sends "nc=00000001". The purpose of this directive is to allow the server to detect request replays by maintaining its own copy of this count—if the same nc-value is seen twice, then the request is a replay".

The clientNonce (or cnonce) is a value that, according to RFC 2617, "MUST be specified if a qop directive is sent (see above), and MUST NOT be specified if the server did not send a qop directive in the WWW-Authenticate header field. The cnonce-value is an opaque quoted string value provided by the client and used by both client and server to avoid chosen plaintext attacks, to provide mutual authentication, and to provide some message integrity protection."

In the above equation 4, H(A1) is the same as that for RFC 2069. H(A2) is the same as for RFC 2069 if qop is equal to "AUTH", since no integrity protection is required. If the qop is equal to "AUTH-INT", then H(A2) provides for integrity protection, and is defined as:

$$H(A2)=H(\text{method:digestURI:MD5(entityBody)}) \quad (5)$$

Thus, the RFC 2617 algorithm includes more information including some client information such as a client-nonce in creating the response at arrow 140.

Client 112 then sends the response, along with other information, back to service provider 110, as shown by arrow 150. The other information can include plain text information such as the user name, client nonce, among other values.

Service provider 110 can then use the response received at the message of arrow 150, along with information stored at service provider 110 in order to also create a response as shown at arrow 160.

The service provider 110 may then compare the response created at arrow 160 to the response received at arrow 150, as shown at arrow 170. If the two responses match, then the client 112 is authenticated with service provider 110 and communication can occur for the client to receive the desired information, as shown by arrow 180 in the example of FIG. 1.

Thus, as seen in FIG. 1, the HTTP digest authentication as described requires both the client and the server to know a pre-shared secret such as a password.

In accordance with embodiments of the present disclosure, the need for a pre-shared secret between the client and server is removed and replaced utilizing a dynamic shared secret. In particular, reference is now made to FIG. 2 showing an exemplary flow diagram according to embodiments of the present disclosure.

Figure 2:
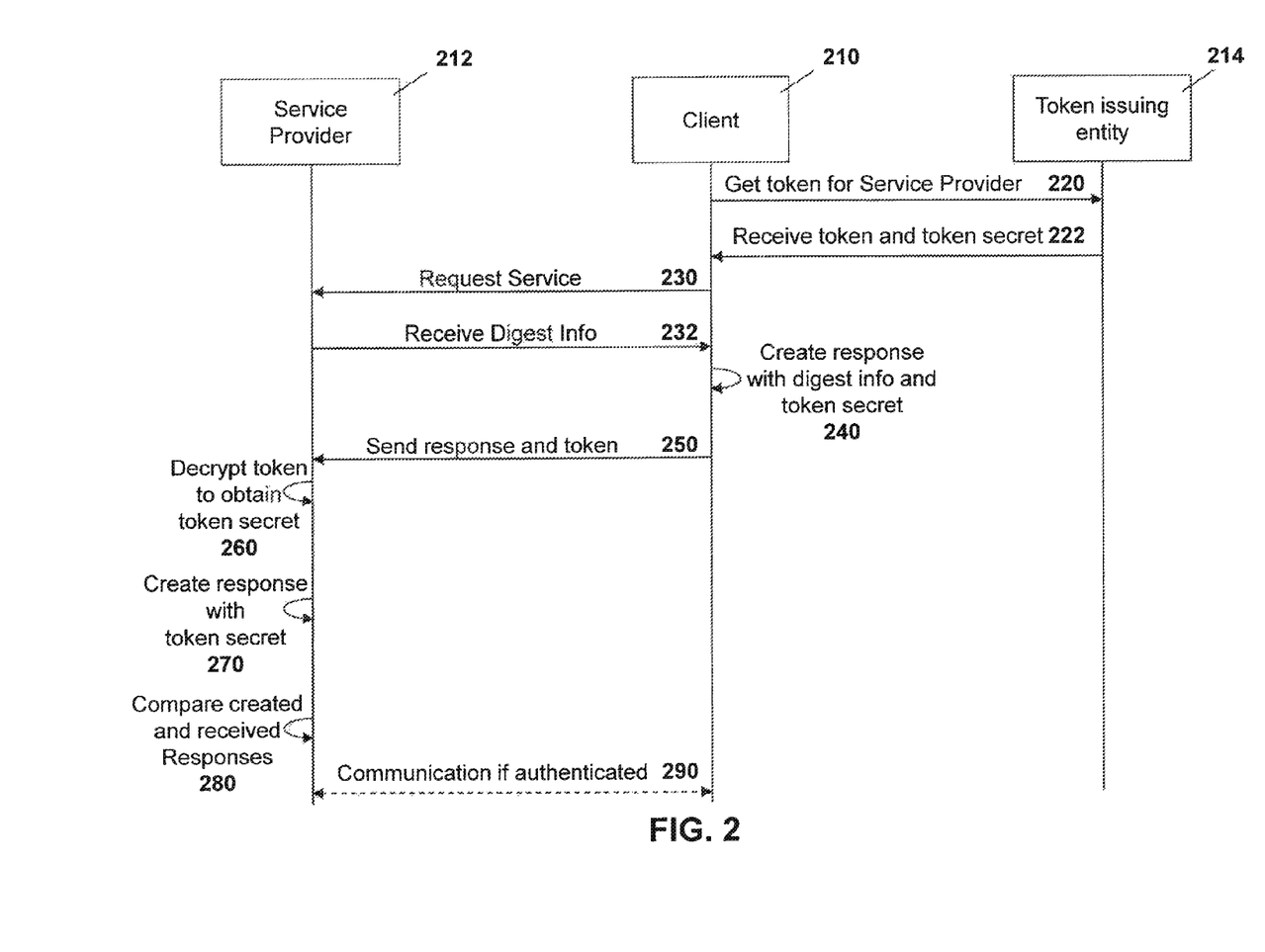
FIG. 2 is an example flow diagram showing authentication between a client and a server using a token issuing entity.

In the embodiment of FIG. 2, a client 210 is in communication with a service provider 212. Client 210 also has a relationship with and communicates with a token issuing entity 214. Again, such communication can, for example, be wired, wireless, or both, and can occur over public or private networks in some embodiments.

Service provider 212 also has a relationship with token issuing entity 214 and secure communication can occur between the service provider and token issuing entity 214.

Token issuing entity 214 can be any server in a network, and may include trusted network elements such as, for example, an enterprise server, a server that is operated by a carrier or a device manufacturer, among others.

In the embodiment of FIG. 2, client 210 wishes to obtain service from a service provider 212. In this regard, client 210 makes a request to token issuing entity 214 for a token, as shown by arrow 220.

In response to the message at arrow 220 and upon authentication of client 210, token issuing entity 214 sends client 210 an encrypted token containing a token secret, as well as a copy of the token secret either in an unencrypted format or a format that can be decrypted at the client 210. The authentication of client 210 with token issuing entity 214 may, for example, be based on encryption keys that were previously exchanged or on another method of authentication.

The encrypted token is encrypted with a key that is known by service provider 212, and the encrypted token contains the token secret. The receipt of the encrypted token along with an unencrypted token secret are shown in FIG. 2 at arrow 222. In one embodiment, client 210 does not have the decryption key to decrypt the token.

Client 210 may then request a service from the service provider 212, as seen by arrow 230.

Service provider 212 may determine that client 210 is not authenticated and may therefore send a contention message [i.e. a "challenge"], as shown by arrow 232 back to client 210. The contention message may contain an error, such as, for example, a "401 unauthenticated" error, along with digest information which may be similar to the information found in message 130 of FIG. 1, in some embodiments.

It should be noted that the order of the steps of the transaction can be varied. For example, in alternative embodiments, the service request at arrow 230 and the receipt of the digest information 232 could occur before client 210 asks for a token from the token issuing entity.

In response to the receipt of the digest information at message 232, client 210 may create a response with the digest information and the token secret, as described in more detail below. This is shown with arrow 240 in FIG. 2.

In particular, instead of using a shared secret between client 210 and service provider 212, the authentication between the client and the server may be provided through the use of the token secret. Thus, from equations 1 and 4 above, H(A1), in either the RFC 2069 or 2617 specifications can be amended to be:

$$H(A1)=H(\text{user name:realm:token secret}) \quad (6)$$

In one embodiment the remainder of the RFC 2069 or 2617 algorithms may be used by both the service provider and the client. For example, using the H(A1) calculated in equation 6, the H(A1) could then be used in equation 1 above for an RFC 2069 algorithm or in equation 4 above for an RFC 2617 algorithm. H(A2) could be calculated based on either equation 3 or equation 5 above. However, the present disclosure is not limited to those algorithms.

Once the response is created at message 240, the client 210 may send a response to the challenge at arrow 232 to service provider 212. This is shown by arrow 250 in the embodiment of FIG. 2. The response sent at arrow 250 can include the response created at arrow 240, along with other information such as a client nonce and the encrypted token containing the token secret received from the token issuing entity 214. The client 210 does not provide the unencrypted token secret in the message at arrow 250.

Once the service provider 212 receives the response, it decrypts the token to obtain the token secret, as shown by arrow 260.

The decryption of the token can occur based on the relationship between the service provider 212 and token issuing entity 214. For example, in some embodiments, once an encrypted token is received, the service provider 212 can communicate with token issuing entity 214 to receive a decryption key. In other embodiments, the decryption key may be stored at service provider 212 based on previous communications with token issuing entity 214.

In some embodiments of the present disclosure, the token is encrypted based on an attribute of client 210. Thus, the encryption of the token may be specific to a specific client, or a level of granularity may be introduced such as a certain class of client has a particular encryption and decryption key. For example, if client 210 is a mobile device, a first key may be used to encrypt the token, whereas if client 210 is a desktop computer, a different encryption key may be used to encrypt the token. In this case, both the service provider 212 and the token issuing entity 214 will need to know the class of the client 210. Other attributes of the client may be used to distinguish between various encryption/decryption keys for the token.

Thus, the decryption at arrow 260 could be specific to the client or class of client with which service provider 212 is communicating. One way to provide service provider 212 with information for decryption may be through HTTP code providing a client class or an identifier for the client. Other possibilities would be apparent to those skilled in the art.

Once service provider 212 has successfully decrypted the token to obtain the token secret, the service provider 212 may use the information found in the response of arrow 250, as well as the token secret, in order to compose its own response string, as shown by arrow 270.

The service provider 212 may then compare the response it created with the response that was received at the message of arrow 250, as shown by arrow 280, in order to determine whether or not the client 210 is authentic. If the two strings match, then the service provider 212 may authenticate client 210 and communication, as shown by arrow 290, may occur between client 210 and service provider 212.

The embodiment of FIG. 2 may be used, for example, with a modified version of the IETF RFC 2069 or 2617 specifications. However, the present disclosure is not limited to those algorithms described in the IETF RFCs and in other embodiments, different algorithms could be used.

In accordance with FIG. 2, client 210 never needs to have a shared secret that is shares with service provider 212, but rather relies on its relationship with the token issuing entity 214 and the relationship between service provider 212 and token issuing entity 214.

The communication between client 210 and token issuing entity 214, as well as the communication between service provider 212 and token issuing entity 214, may be more secure than the use of a digest authentication code. For example, public key/private key encryption may be used between client 210 and token issuing entity 214 as well as between service provider 212 and token issuing entity 214 in some embodiments. Other types of encryption for the communications between these entities is also possible. Thus, the communication between the token issuing entity and the other entities can be secure.

The encryption of the token at the token issuing entity 214 can use any encryption algorithm and the present disclosure is not meant to be limited to any particular encryption algorithm.

Client 210 can be any computing device. Examples of such computing devices may include desktop computers, laptop computers, mobile devices such as smartphones, tablets, among others.

The service provider and token issuing entity can be any network element including various network servers.

Figure 3:
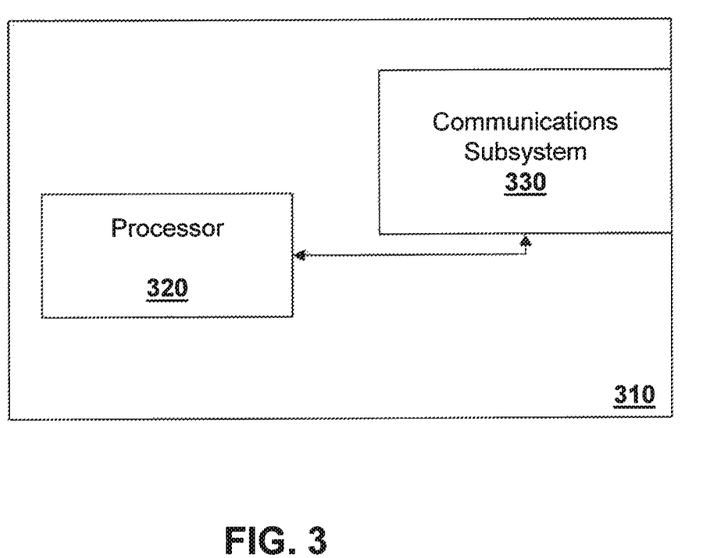
FIG. 3 is an exemplary block diagram of a simplified computing device.

Reference is now made to FIG. 3, which shows a generalized computing device, which may comprise a server for a service provider 212 or token issuing entity 214, or may comprise a client device 210.

In FIG. 3, computing device 310 includes a processor 320 and a communications subsystem 330, where the processor 320 and communications subsystem 330 cooperate to perform the methods described above.

If client device 210 is a mobile device or user equipment (UE), one exemplary UE is illustrated below with regard to FIG. 4.

UE 400 is typically a two-way wireless communication device having voice and data communication capabilities. UE 400 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 400 is enabled for two-way communication, it may incorporate a communication subsystem 411, including both a receiver 412 and a transmitter 414, as well as associated components such as one or more antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. The radio frequency front end of communication subsystem 411 can be any of the embodiments described above.

Network access requirements will also vary depending upon the type of network 419. In some networks network access is associated with a subscriber or user of UE 400. A UE may require a removable user identity module (RUIM) or a subscriber identity module (SIM) card. The SIM/RUIM interface 444 is normally similar to a card-slot into which a SIM/RUIM card can be inserted and ejected. The SIM/RUIM card can have memory and hold many key configurations 451, and other information 453 such as identification, and subscriber related information.

When required network registration or activation procedures have been completed, UE 400 may send and receive communication signals over the network 419. As illustrated in FIG. 4, network 419 can consist of multiple base stations communicating with the UE.

Signals received by antenna 416 through communication network 419 are input to receiver 412, which may perform such common receiver functions as signal amplification, frequency down conversion, filtering, channel selection and the like. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

UE 400 generally includes a processor 438 which controls the overall operation of the device. Communication functions, including data and voice communications, are performed through communication subsystem 411. Processor 438 also interacts with further device subsystems such as the display 422, flash memory 424, random access memory (RAM) 426, auxiliary input/output (I/O) subsystems 428, serial port 430, one or more keyboards or keypads 432, speaker 434, microphone 436, other communication subsystem 440 such as a short-range communications subsystem and any other device subsystems generally designated as 442. Serial port 430 could include a USB port or other port known to those in the art.

Figure 4:
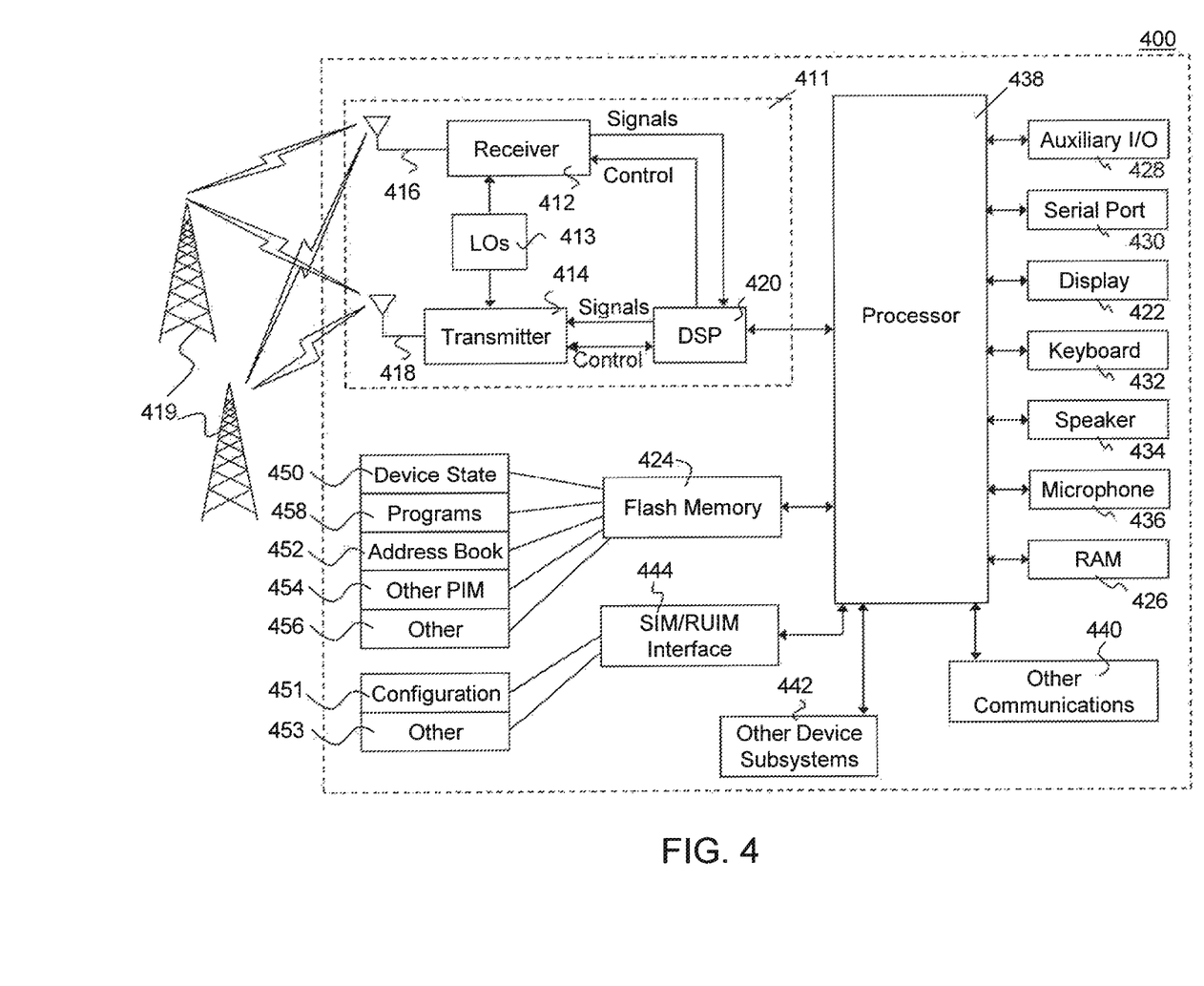
FIG. 4 is an exemplary block diagram of an example mobile device capable of being used with the embodiments of the present disclosure.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the processor 438 may be stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Processor 438, in addition to its operating system functions, may enable execution of software applications on the UE. A predetermined set of applications that control basic operations, including at least data and voice communication applications for example, will normally be installed on UE 400 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 419. Further applications may also be loaded onto the UE 400 through the network 419, an auxiliary I/O subsystem 428, serial port 430, short-range communications subsystem 440 or any other suitable subsystem 442, and installed by a user in the RAM 426 or a non-volatile store (not shown) for execution by the processor 438. Such flexibility in application installation increases the functionality of the device and may provide enhanced on-device functions, communication-related functions, or both. For example, secure communication applications may enable electronic commerce functions and other such financial transactions to be performed using the UE 400.

In a data communication mode, a received signal such as a text message or web page download will be processed by the communication subsystem 411 and input to the processor

438, which may further process the received signal for output to the display 422, or alternatively to an auxiliary I/O device 428.

A user of UE 400 may also compose data items such as email messages for example, using the keyboard 432, which may be a complete alphanumeric keyboard or telephone-type keypad, among others, in conjunction with the display 422 and possibly an auxiliary I/O device 428. Such composed items may then be transmitted over a communication network through the communication subsystem 411.

For voice communications, overall operation of UE 400 is similar, except that received signals would typically be output to a speaker 434 and signals for transmission would be generated by a microphone 436. Alternative voice or audio I/O subsystems, such as a voice message recording subsystem, may also be implemented on UE 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4 would normally be implemented in a personal digital assistant (PDA)-type UE for which synchronization with a user's desktop computer (not shown) may be desirable, but is an optional device component. Such a port 430 would enable a user to set preferences through an external device or software application and would extend the capabilities of UE 400 by providing for information or software downloads to UE 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the UE to a computer to act as a modem or for charging purposes.

Other communications subsystems 440, such as a short-range communications subsystem, is a further optional component which may provide for communication between UE 400 and different systems or devices, which need not necessarily be similar devices. For example, the subsystem 440 may include an infrared device and associated circuits and components or a Bluetooth™ communication module to provide for communication with similarly enabled systems and devices. Subsystem 440 may further include non-cellular communications such as WiFi or WiMAX, or near field communications (NFC), among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a computing device comprising:
    receiving a message from a token issuing entity, the message including a token secret, e token secret being in encrypted format;
    receiving a challenge from a service provider;
    creating a response utilizing information from the challenge and the token secret, said creating utilizing a hash function which hashes the token secret as a shared secret between the computing device and the service provider; and
    forwarding the response and token secret to the service provider; wherein the computing device does not have a decryption key for decrypting the token secret.

2. The method of claim 1, wherein the hash function is based on a first hash of a username, realm and the token secret, and a second hash of a method and a digest uniform resource indicator, the first and second hashes being hashed together along with a nonce.

3. The method of claim 1, wherein the hash function is based on a first hash of a username, realm and the token secret, and a second hash of a method, a digest uniform resource indicator and a hash of an entity body, the first and second hashes being hashed together along with a nonce, a nonce count, a client nonce, and a quality of protection value.

4. The method of claim 1, wherein the hash function is an MD5hash function.

5. The method of claim 1, wherein the receiving the challenge occurs after an initial communication between the computing device and the service provider.

6. The method of claim 1, wherein the receiving the token secret occurs after the receiving the challenge.

7. The method of claim 1, wherein the computing device is a mobile device.

8. A computing device comprising:
    a processor, and
    a communications subsystem,
    wherein the computing device is configured to:
        receive a message from a token issuing entity, the message including a
    token secret, the token secret in encrypted format;
        receive a challenge from a service provider;
        create a response utilizing information from the challenge and the token secret with a hash function which hashes the token secret as a shared secret between the computing device and the service provider; and
        forward the response and token secret to the service provider;
    wherein the computing device does not have a decryption key for decrypting the token secret.

9. The computing device of claim 8, wherein the hash function is based on a first hash of a username, realm and the token secret, and a second hash of a method and a digest uniform resource indicator, the first and second hashes being hashed together along with a nonce.

10. The computing device of claim 8, wherein the hash function is based on a first hash of a username, realm and the token secret, and a second hash of a method, a digest uniform resource indicator and a hash of an entity body, the first and second hashes being hashed together along with a nonce, a nonce count, a client nonce, and a quality of protection value.

11. The computing device of claim 8, wherein the hash function is an MD5 hash function.

12. The computing device of claim 8, further configured to receive the challenge after an initial communication between the computing device and the service provider.

13. The computing device of claim 8, further configured to receive the token secret after the receiving the challenge .

14. The computing device of claim 8, wherein the computing device is a mobile device.

15. A non-transitory computer readable medium having stored thereon instructions for execution by a processor of a computing device, the instructions including code for:
   receiving a message from a token issuing entity, the message including a token secret, the token secret in encrypted format;
   receiving a challenge from a service provider;
   creating a response utilizing information from the challenge and the token secret, said creating utilizing a hash function which hashes the token secret as a shared secret between the computing device and the service provider; and
   forwarding the response and token secret to the service provider;
   wherein the computing device does not have a decryption key for decrypting the token secret.

16. The non-transitory computer readable medium of claim 15, wherein the hash function is based on a first hash of a username, realm and the token secret, and a second hash of a method and a digest uniform resource indicator, the first and second hashes being hashed together along with a nonce.

17. The non-transitory computer readable medium of claim 15, wherein the hash function is based on a first hash of a username, realm and the token secret, and a second hash of a method, a digest uniform resource indicator and a hash of an entity body, the first and second hashes being hashed together along with a nonce, a nonce count, a client nonce, and a quality of protection value.

18. The non-transitory comp eadable medium of claim 15, wherein the hash function is an MD5 hash function.

19. The non-transitory computer readable medium of claim 15, wherein the receiving the challenge occurs after an initial communication between the computing device and the service provider.

20. The non-transitory computer readable medium of claim 15, wherein the receiving the token secret occurs after the receiving the challenge.

21. The non-transitory computer readable medium of claim 15, wherein the computing device is a mobile device.

22. A method at a service provider comprising:
   receiving a service request from an unauthorized client;
   providing a challenge to the client;
   receiving, from the client, a response, the response including digest information and an encrypted token;
   decrypting the token to obtain a token secret, the decrypting utilizing a key obtained from a token issuing entity;
   creating a server response utilizing information from the challenge and the token secret with a hash function which hashes the token secret as a shared secret between the client and the service provider; and
   authenticating the client if the server response matches the digest information.

23. The method of claim 22, wherein the key is specific for the client.

24. The method of claim 22, wherein the key is associated with an attribute of the client.

25. The method of claim 24, wherein the attribute is a device type.

26. The method of claim 22, wherein the hash function is based on a first hash of a username, realm and the token secret, and a second hash of a method and a digest uniform resource indicator, the first and second hashes being hashed together along with a nonce.

27. The method of claim 26, wherein the hash function is an MD5 hash function.

28. The method of claim 22, wherein the hash function is based on a first hash of a username, realm and the token secret, and a second hash of a method, a digest uniform resource indicator and a hash of an entity body, the first and second hashes being hashed together along with a nonce, a nonce count, a client nonce, and a quality of protection value.

29. A server comprising:
   a processor; and
   a communications subsystem,
   wherein the server is configured to:
      receive a service request from an unauthorized client;
      provide a challenge to the client;
      receive, from the client, a response, the response including digest information and an encrypted token;
      decrypt the token to obtain a token secret utilizing a key obtained from a token issuing entity;
      create a server response utilizing information from the challenge and token secret with a hash function which hashes the token secret as a shared secret between the client and the service provider; and
      authenticate the client if the server response matches the digest information.

30. The server of claim 29, wherein the key is specific for the client.

31. The server of claim 29, wherein the key is associated with an attribute of the client.

32. The server of claim 31, wherein the attribute is a device type.

33. The server of claim 29, wherein the hash function is based on a first hash of a username, realm and the token secret, and a second hash of a method and a digest uniform resource indicator, the first and second hashes being hashed together along with a nonce.

34. The server of claim 33, wherein the hash function is an MD5 hash function.

35. The server of claim 29, wherein the hash function is based on a first hash of a username, realm and the token secret, and a second hash of a method, a digest uniform resource indicator and a hash of an entity body, the first and second hashes being hashed together along with a nonce, a nonce count, a client nonce, and a quality of protection value.

36. A non-transitory computer readable medium having stored thereon instructions for execution by a processor of a service provider, the instructions including code for:
   receiving a service request from an unauthorized client;
   providing a challenge to the client;
   receiving, from the client, a response, the response including digest information and an encrypted token;
   decrypting the token to obtain a token secret, the decrypting utilizing a key obtained from a token issuing entity;
   creating a server response utilizing information from the challenge and the token secret with a hash function which hashes the token secret as a shared secret between the client and the service provider; and
   authenticating the client if the server response matches the digest information.

37. The non-transitory computer readable medium of claim 36, wherein the key is specific for the client.

38. The non-transitory computer readable medium of claim 36, wherein the key is associated with an attribute of the client.

39. The non-transitory computer readable medium of claim 38, wherein the attribute is a device type.

40. The non-transitory computer readable medium of claim 36, wherein the hash function is based on a first hash of a username, realm and the token secret, and a second hash of a method and a digest uniform resource indicator, the first and second hashes being hashed together along with a nonce.

41. The non-transitory computer readable medium of claim 40, wherein the hash function is an MD5 hash function.

42. The non-transitory computer readable medium of claim 36, wherein the hash function is based on a. first hash of a username, realm and the token secret, and a second hash of a method, a digest uniform resource indicator and a hash of an entity body, the first and second hashes being hashed together along with a nonce, a nonce count, a client nonce, and a quality of protection value.

\* \* \* \* \*

UNITED STATES PATENT AND TRADEMARK OFFICE
CERTIFICATE OF CORRECTION

PATENT NO.        : 9,210,145 B2
APPLICATION NO.   : 13/739710
DATED             : December 8, 2015
INVENTOR(S)       : Mulla et al.

Page 1 of 1

It is certified that error appears in the above-identified patent and that said Letters Patent is hereby corrected as shown below:

In the claims

Column 9, Line 63, claim 1 delete "e token secret" insert --the token secret--

Column 11, Line 29, claim 18 delete "comp eadable medium" insert --computer readable medium--

Signed and Sealed this
Twenty-ninth Day of March, 2016

Michelle K. Lee
*Director of the United States Patent and Trademark Office*